(12) United States Patent
Wu et al.

(10) Patent No.: US 11,943,709 B2
(45) Date of Patent: Mar. 26, 2024

(54) METHOD AND SYSTEM FOR DYNAMIC ACCESS POINT SELECTION IN COORDINATED ACCESS POINT GROUP

(71) Applicant: Samsung Electronics Co., Ltd., Gyeonggi-do (KR)

(72) Inventors: Tianyu Wu, Fremont, CA (US); Wook Bong Lee, San Jose, CA (US); Ashok Ranganath, San Jose, CA (US); Srinivas Kandala, Morgan Hill, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/592,935

(22) Filed: Feb. 4, 2022

(65) Prior Publication Data

US 2022/0167265 A1     May 26, 2022

Related U.S. Application Data

(62) Division of application No. 16/529,335, filed on Aug. 1, 2019, now Pat. No. 11,272,442.

(Continued)

(51) Int. Cl.
*H04W 48/20*     (2009.01)
*H04B 17/318*     (2015.01)
(Continued)

(52) U.S. Cl.
CPC .......... *H04W 48/20* (2013.01); *H04B 17/318* (2015.01); *H04W 12/06* (2013.01); *H04W 24/10* (2013.01)

(58) Field of Classification Search
None
See application file for complete search history.

(56) References Cited

U.S. PATENT DOCUMENTS 6,052,369 A * 4/2000 Hamalainen ....... H04Q 11/0478
                                              370/522
6,295,284 B1 * 9/2001 Maggenti ............ H04W 84/08
                                             370/444

(Continued)

FOREIGN PATENT DOCUMENTS

CN            101483893      3/2011
WO     WO 2013/126666      8/2013

OTHER PUBLICATIONS

Taiwanese Office Action dated Jun. 30, 2023 issued in counterpart application No. 108132275, 17 pages.

*Primary Examiner* — Nguyen H Ngo
(74) *Attorney, Agent, or Firm* — The Farrell Law Firm, P.C.

(57) ABSTRACT

A method and device are provided for dynamic access point (AP) selection by a coordinator in a coordinated AP group. The coordinator of the coordinated AP group receives one or more link quality metrics for each link between a station (STA) and each of a plurality of member APs in the coordinated AP group, from the plurality of member APs. The coordinator selects an anchor AP for the STA from the plurality of member APs based on the one or more link quality metrics for each link. The anchor AP is used to relay transmissions between the STA and the coordinator. Authentication of the STA with the anchor AP is shared with all APs in the coordinated AP group, allowing the STA to utilize any subsequently selected anchor AP to relay transmissions without re-authentication.

7 Claims, 5 Drawing Sheets

Related U.S. Application Data

(60) Provisional application No. 62/728,398, filed on Sep. 7, 2018.

(51) Int. Cl.
    *H04W 12/06* (2021.01)
    *H04W 24/10* (2009.01)

(56) References Cited

U.S. PATENT DOCUMENTS

| | | | | |
|---|---|---|---|---|
| 6,349,224 | B1* | 2/2002 | Lim | H04L 67/04 |
| | | | | 455/567 |
| 6,920,125 | B1* | 7/2005 | Wu | H04L 69/168 |
| | | | | 370/465 |
| 6,973,308 | B1* | 12/2005 | Smith | H04W 36/16 |
| | | | | 455/445 |
| 7,006,471 | B1* | 2/2006 | Iverson | H04W 36/0007 |
| | | | | 370/335 |
| 7,440,756 | B1 | 10/2008 | Wang et al. | |
| 8,965,403 | B2 | 2/2015 | Rieger, III | |
| 9,363,175 | B2 | 6/2016 | Chu | |
| 9,596,607 | B2 | 3/2017 | Chen et al. | |
| 9,826,457 | B1 | 11/2017 | Osborn | |
| 2003/0073455 | A1* | 4/2003 | Hashem | H04W 48/20 |
| | | | | 455/436 |
| 2008/0042912 | A1 | 2/2008 | Lee | |
| 2009/0010187 | A1 | 1/2009 | Agarwal et al. | |
| 2013/0143541 | A1* | 6/2013 | Henderson | H04W 16/24 |
| | | | | 455/418 |
| 2014/0003331 | A1* | 1/2014 | Klein | H04B 3/50 |
| | | | | 370/328 |
| 2014/0162592 | A1* | 6/2014 | Peitzer | H04B 1/3838 |
| | | | | 455/405 |
| 2015/0085746 | A1* | 3/2015 | Somayazulu | H04W 48/08 |
| | | | | 370/328 |
| 2015/0162959 | A1* | 6/2015 | Jindal | H04B 7/0413 |
| | | | | 370/329 |
| 2015/0237572 | A1 | 8/2015 | Kim | |
| 2015/0295629 | A1 | 10/2015 | Xia et al. | |
| 2016/0081130 | A1 | 3/2016 | Wang et al. | |
| 2016/0088068 | A1 | 3/2016 | Toy | |
| 2019/0222505 | A1* | 7/2019 | Kaneko | H04L 12/66 |
| 2019/0320385 | A1 | 10/2019 | Bhartia | |
| 2020/0107259 | A1 | 4/2020 | Allanki | |

* cited by examiner

METHOD AND SYSTEM FOR DYNAMIC ACCESS POINT SELECTION IN COORDINATED ACCESS POINT GROUP

PRIORITY

This application is a Divisional Application of U.S. application Ser. No. 16/529,335, filed in the U.S. Patent and Trademark Office (USPTO) on Aug. 1, 2019, which is based on and claims priority under 35 U.S.C. § 119(e) to a U.S. Provisional Application No. 62/728,398, filed in the USPTO on Sep. 7, 2018, the contents of which are incorporated herein by reference.

FIELD

The present disclosure relates generally to access point (AP) coordination, and more particularly, to a method and a system for dynamic AP selection in a coordinated AP group.

BACKGROUND

Multiple AP (multi-AP) coordinated transmission is a key technology in extreme high throughput (EHT) WiFi. Multi-AP coordination technologies for EHT include, for example, dynamic AP selection in which an optimal AP is selected from a group of APs for a station (STA), allowing roaming to be easily performed by the STA within the group of APs.

Multi-AP coordination technologies also include, for example, transmissions between multiple APs and multiple STAs. These APs and STAs jointly form orthogonal frequency division multiple access (OFDMA) packets, and transmissions between different APs and different STAs occupy different resource units (RUs).

Existing technologies additionally include, for example, multi-AP coordinated spatial reuse, in which beamforming is coordinated with spatial nulling, and multi-AP joint beamforming, in which multiple APs jointly beamform to a single STA. Multi-AP coordination technologies include distributed multi-user multiple-input multiple-output (MU-MIMO) procedures between multiple APs and multiple STAs.

Handover in Wi-Fi systems typically requires a hard stop and switch to another AP, as well as a significant number of message exchanges, causing overhead. In some cases, a STA may need to keep handovers between only two APs. In other cases, handover disrupt service discontinuity occurs. Further, a STA may stick to a certain AP, causing performance degradation. An AP may want to direct a certain STA to another AP for load balancing purposes.

SUMMARY

According to one embodiment, a method is provided for dynamic AP selection by a coordinator in a coordinated AP group. The coordinator of the coordinated AP group receives one or more link quality metrics for each link between a STA and each of a plurality of member APs in the coordinated AP group, from the plurality of member APs. The coordinator selects an anchor AP for the STA from the plurality of member APs based on the one or more link quality metrics for each link. The anchor AP is used to relay transmissions between the STA and the coordinator. Authentication of the STA with the anchor AP is shared with all APs in the coordinated AP group, allowing the STA to utilize any subsequently selected anchor AP to relay transmissions without re-authentication.

According to one embodiment, an electronic device is provided that includes a processor, and a non-transitory computer readable storage medium storing instructions. When executed, the instructions cause the processor to receive one or more link quality metrics for each link between a STA and each of a plurality of member APs in a coordinated AP group, from the plurality of member APs. The instructions further cause the processor to select an anchor AP for the STA from the plurality of member APs based on the one or more link quality metrics for each link. The anchor AP is used to relay transmissions between the STA and the electronic device. Authentication of the STA with the anchor AP is shared with all APs in the coordinated AP group, allowing the STA to utilize any subsequently selected anchor AP to relay transmissions without re-authentication.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
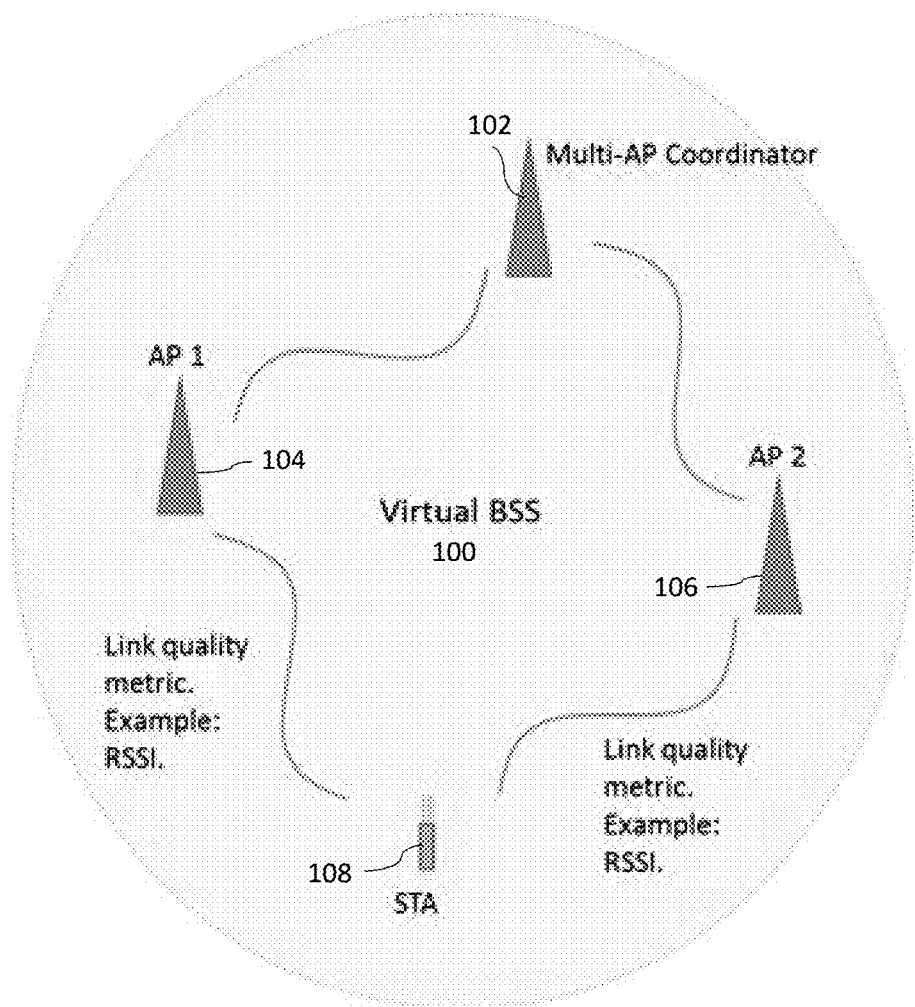
FIG. 1 is a diagram illustrating a virtual basic service set (BSS), according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such a first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "$2^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

FIG. 1 is a diagram illustrating a virtual BSS, according to one embodiment. A virtual BSS 100 is an infrastructure BSS with a group of coordinated APs. In the coordinated AP group, there is a single coordinator 102 and one or more member APs. FIG. 1 illustrates a first member AP 104 and a second member AP 106. All member APs share the same service set identifier (SSID). All member APs may share the same basic service set identifier (BSSID). All member APs also share the association and/or authentication with a STA 108, such that when the STA 108 is roaming within the virtual BSS 100, no re-association and/or re-authentication is required.

The STA 108 uses the same association identifier (AID) in the virtual BSS 100. Specifically, after the AID is assigned by the coordinator 102, it is shared among all APs in the group of coordinated APs (i.e., the first member AP 104 and the second member AP 106 of FIG. 1).

The STA 108 selects an anchor AP, from member APs in the group of coordinated APs, based on link quality metrics, such as, for example, received signal strength indicators (RSSIs). The STA keeps a local copy of capabilities of the anchor AP and neighboring APs in the group of coordinated APs.

Figure 2:
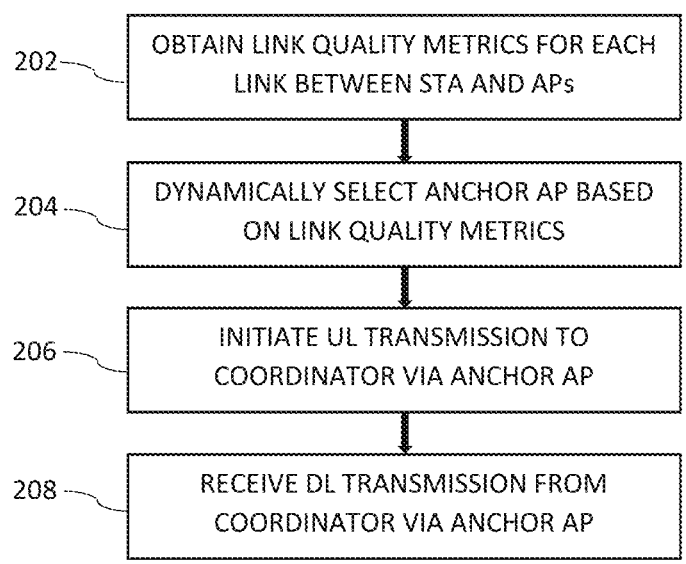
FIG. 2 is a flowchart illustrating a method for dynamic AP selection by a STA, according to one embodiment.

FIG. 2 is a flowchart illustrating a method for dynamic AP selection by a STA, according to one embodiment. The STA obtains link quality metrics for each link between the STA and member APs, at 202. Link quality metrics may be obtained through measurements at the STA (e.g., RSSI), or from information received from member APs. Such information may include, for example, a member AP's channel capacity to a coordinator, a member AP's capabilities, and a number of STAs attached to a member AP. A member AP may send all AP side link quality metric information measured at member APs (AP side link quality metrics) to the STA.

Figure 3:
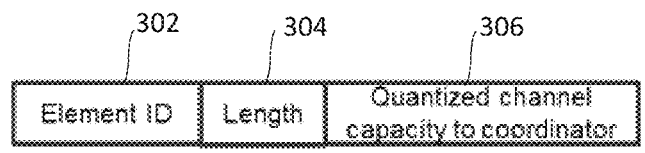
FIG. 3 is a diagram illustrating an information element (IE) for AP side link quality metrics, according to one embodiment.

New information elements (IEs) for the AP side link quality metrics are defined. The member AP may send the new IEs in a beacon. FIG. 3 is a diagram illustrating an IE for AP side link quality metrics, according to an embodiment. The IE includes an element identifier (ID) 302, a length 304, and a quantized channel capacity to a coordinator 306.

Referring back to FIG. 2, the STA dynamically selects an anchor AP for the STA from the member APs based on the link quality metrics for each link with the member APs, at 204. The anchor AP is used to relay transmissions between the STA and a coordinator. Authentication of the STA with the at least one anchor AP is shared with all APs in the coordinated AP group, allowing the STA utilize any subsequently selected anchor AP to relay transmissions without re-authentication.

When the STA selects an anchor AP or switches to a new anchor AP, the STA initiates an UL transmission, at 206. The STA sets an Address 1 in the MAC header to a MAC address of the selected anchor AP, sets an Address 2 to a MAC address of the STA, and sets the Address 4 to a MAC address of the coordinator. The anchor AP relays the data to the coordinator, and sets the Address 4 to the MAC address of the STA, sets the Address 2 to the MAC address of the anchor AP, and sets the Address 1 to the MAC address of the coordinator. DL packets are transmitted from the coordinator to the STA, at 208. The coordinator sends the data to the anchor AP indicated in the Address 1 of the most recent UL packet from the STA.

Figure 4:
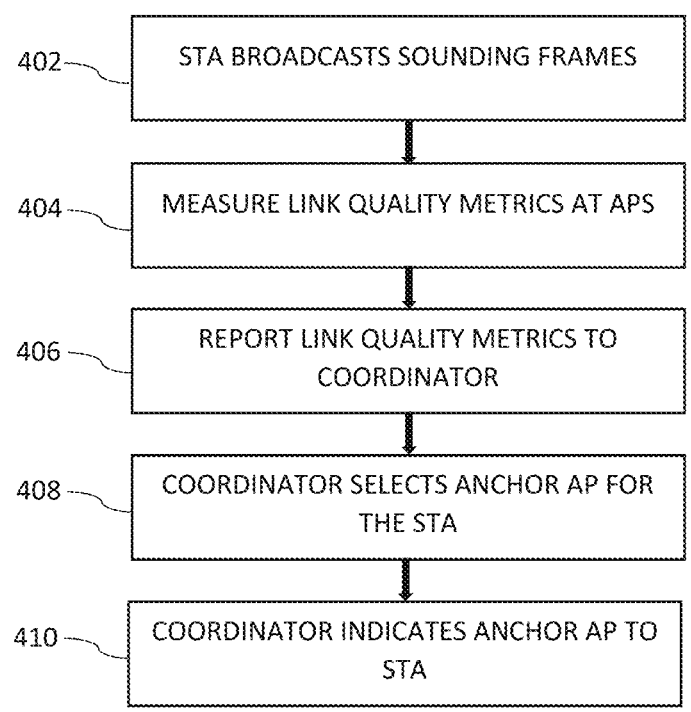
FIG. 4 is a flowchart illustrating a method for a coordinator controlled AP selection, according to one embodiment.

FIG. 4 is a flowchart illustrating a method for coordinator controlled AP selection, according to one embodiment. A STA requests switching of an anchor AP and broadcasts sounding frames, at 402. The STA provides measurement information to the neighboring member APs by, for example, individually reporting channel state information (CSI) to the neighboring member APs, or broadcasting sounding neighbor discovery protocol (NDP) packets to the neighboring member APs, or reporting CSI of member APs to the anchor AP.

Member APs that receive the broadcast sounding frames measure the link quality metric (e.g., RSSI) based on the sounding packets, at 404, and report the link quality metric to the coordinator, at 406.

The coordinator selects the anchor AP for the STA based on the received link quality metrics, at 408. The coordinator indicates the selected anchor AP by a data frame to the STA, at 410. The coordinator sets the Address 3 to the MAC address of the STA, the Address 1 to the MAC address of the anchor AP, and the Address 2 to MAC address of the coordinator. The anchor AP relays the packet to the STA, sets the Address 1 to the MAC address of the STA, sets the Address 2 to the MAC address of the anchor AP, and sets the Address 4 to the MAC address of the coordinator. The STA uses the MAC address of the anchor AP as the Address 1 for the following or subsequent UL packets.

In a combination of STA driven AP selection and coordinator controlled AP selection, the STA selects a first anchor AP for UL transmission, and the coordinator determines a second anchor AP for DL transmission.

Figure 5:
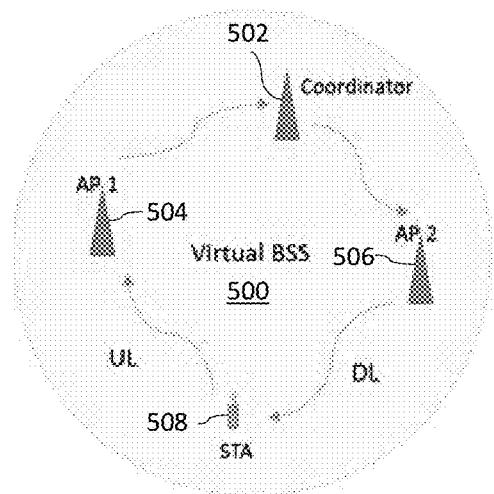
FIG. 5 is a diagram illustrating a virtual BSS with more than one anchor AP, according to one embodiment.

FIG. 5 is a diagram illustrating a virtual BSS with more than one anchor AP, according to one embodiment. Within a virtual BSS 500, UL traffic flows from a STA 508, to a coordinator 502, via a first member anchor AP 504. DL traffic flows from the coordinator 502, to the STA 508, via a second member anchor AP 506.

Figure 6:
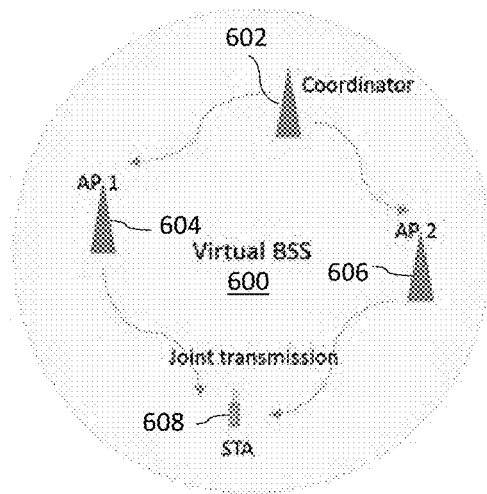
FIG. 6 is a diagram illustrating a virtual BSS with more than one anchor AP, according to another embodiment.

FIG. 6 is a diagram illustrating a virtual BSS with more than one anchor AP, according to another embodiment. Within a virtual BSS 600, DL traffic flows from a coordinator 602, to a STA 608, via both a first member anchor AP 604 and a second member anchor AP 606. Joint transmission can be performed using the same time and frequency resources, or different time and frequency resources (e.g., in a time division multiplexing (TDM)/frequency division multiplexing (FDM) manner).

When the STA driven AP selection scheme is used with multiple anchor APs, the STA is required to inform the coordinator of the list of anchor APs using a new management frame. When the coordinator controlled AP selection scheme is used with multiple anchor APs, the coordinator chooses anchor APs for a STA in DL traffic, and the STA may select an anchor AP for UL transmission.

If there is more than one hop from the coordinator to the STA, the coordinator controlled AP selection scheme remains similar to that described above. In STA driven AP selection, the coordinator may no longer be able to find the anchor AP of the STA based on the UL data packets. Thus, after the STA selects or switches to a new anchor AP, the STA is required to inform the coordinator of its selected/updated anchor AP using a management frame so that the coordinator can update the routing for DL traffic to the STA.

Figure 7:
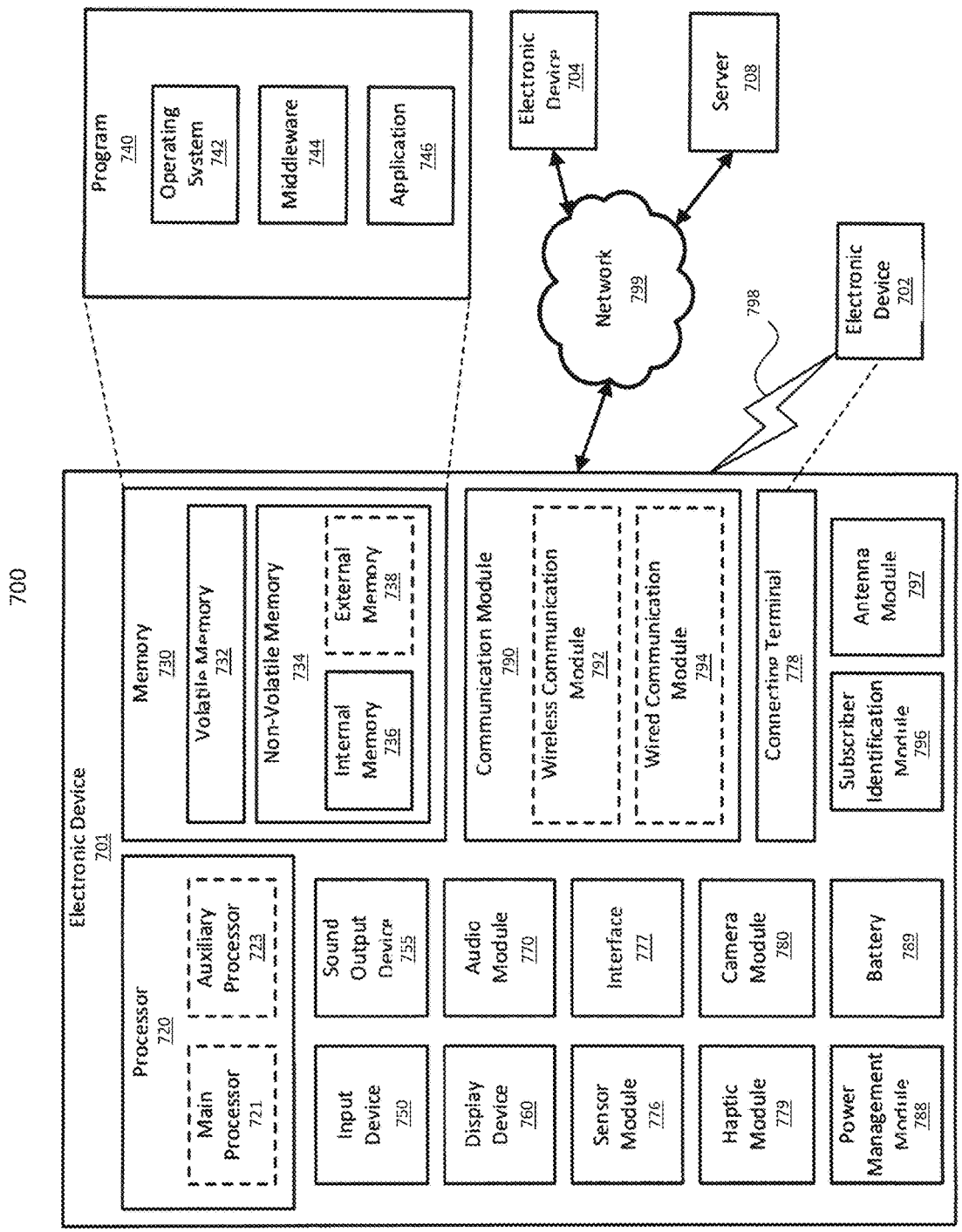
FIG. 7 is a block diagram of an electronic device in a network environment, according to one embodiment.

FIG. 7 is a block diagram of an electronic device in a network environment, according to one embodiment. Referring to FIG. 7, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In one embodiment, at least one (e.g., the display device 760 or the camera module 780) of the components may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, an illuminance sensor, etc.) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. The display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. The interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. The connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. The haptic module 779 may include, for example, a motor, a piezoelectric element, or an electrical stimulator.

The camera module 780 may capture a still image or moving images. The camera module 780 may include one or more lenses, image sensors, image signal processors, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. According to one embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for dynamic access point (AP) selection by a coordinator in a coordinated AP group, the method comprising:
    receiving, by the coordinator of the coordinated AP group, one or more link quality metrics for each pairing between a station (STA) and each of a plurality of member APs in the coordinated AP group, from the plurality of member APs, the one or more link quality metrics comprising at least a channel capacity between a respective member AP and the coordinator;
    selecting, by the coordinator, a first anchor AP for the STA from the plurality of member APs based on the one or more link quality metrics for each pairing, the first anchor AP being used to relay downlink transmissions from the coordinator to the STA; and
    receiving an uplink transmission at the coordinator, from the STA, via a second anchor AP selected by the STA from among the plurality of member APs, to be used to relay uplink transmissions from the STA to the coordinator,
    wherein authentication of the STA with the first anchor AP is shared with all APs in the coordinated AP group, allowing the coordinator to utilize any subsequently selected anchor AP to relay downlink transmissions from the coordinator to the STA without re-authentication.

2. The method of claim 1, wherein the one or more link quality metrics are measured by the plurality of member APs in response to a broadcast of sounding frames from the STA.

3. The method of claim 1, wherein the one or more link quality metrics further comprise received signal strength indicators (RSSIs), and at least one of capabilities of the respective member AP, and a number of STAs attached to the respective member AP.

4. The method of claim 1, further comprising:
    transmitting, by the coordinator, an indication of the first anchor AP in a data frame to the STA, via the first anchor AP.

5. An electronic device, comprising:
    a processor; and
    a non-transitory computer readable storage medium storing instructions that, when executed, cause the processor to:
        receive one or more link quality metrics for each pairing between a station (STA) and each of a plurality of member APs in a coordinated AP group, from the plurality of member APs, the one or more link quality metrics comprising at least a channel capacity between a respective member AP and the coordinator; and
        select a first anchor AP for the STA from the plurality of member APs based on the one or more link quality metrics for each pairing, the first anchor AP being used to relay downlink transmissions from the electronic device to the STA; and receive an uplink transmission, from the STA, via a second anchor AP selected by the STA from among the plurality of member APs, to be used to relay uplink transmissions from the STA to the coordinator, wherein authentication of the STA with the first anchor AP is shared with all APs in the coordinated AP group, allowing the coordinator to utilize any subsequently selected anchor AP to relay downlink transmissions from the coordinator to the STA without re-authentication.

6. The electronic device of claim 5, wherein the one or more link quality metrics are measured by the plurality of member APs in response to a broadcast of sounding frames from the STA.

7. The electronic device of claim 5, wherein the instructions further cause the processor to:

transmit an indication of the first anchor AP in a data frame to the STA, via the first anchor AP.

* * * * *